United States Patent [19]

Reed

[11] Patent Number: 5,241,232
[45] Date of Patent: Aug. 31, 1993

[54] HOMOPOLAR MOTOR-GENERATOR

[75] Inventor: Jay L. Reed, Oviedo, Fla.

[73] Assignee: Science Applications International Corporation, San Diego, Calif.

[21] Appl. No.: 901,656

[22] Filed: Jun. 22, 1992

Related U.S. Application Data

[63] Continuation-in-part of Ser. No. 712,008, Jun. 7, 1991.

[51] Int. Cl.$^5$ .............................................. H02K 31/00
[52] U.S. Cl. ................................. 310/178; 310/75 R; 310/114; 310/115; 60/485; 474/84
[58] Field of Search .................... 310/178, 115–120, 310/75 R, 75 C, 102 R, 102 A, 114; 60/483, 485; 91/4 R; 322/48; 474/153, 84, 85, 88

[56] References Cited

U.S. PATENT DOCUMENTS

| | | |
|---|---|---|
| D. 259,039 | 4/1981 | Weldon . |
| 2,002,793 | 5/1935 | Park ................................ 310/75 R |
| 3,164,027 | 1/1965 | Rood, Jr. ........................ 474/84 |
| 3,185,877 | 5/1965 | Sears . |
| 3,205,384 | 9/1965 | Sears . |
| 3,217,199 | 1/1965 | Musset . |
| 3,737,696 | 6/1973 | Richter . |
| 3,783,502 | 1/1974 | Richter . |
| 3,864,916 | 2/1975 | Maiastrelli ........................ 60/485 |
| 4,544,874 | 10/1985 | Weldon . |
| 4,710,660 | 12/1987 | McKee . |
| 4,858,304 | 8/1989 | Weldon ........................... 310/178 |
| 4,862,757 | 9/1982 | Dahl ............................... 310/178 |

OTHER PUBLICATIONS

Carbon Brushes–The Physics and Chemistry of Sliding Contacts, by E. L. Shobert, II; Chemical Publ., Co., Inc.; New York; (No Month) 1965.
Engineer's Illustrated Thesaurus by H. Hermiker; Chemical Publ. Co.; New York; (No Month) 1952; pp. 226, 227.
J. E. Noeggerath, "Acyclic (Homopolar) Dynamos", A.I.E.E. p. 1; Jan. 1905.
H. D. Varadarjan, "Planetary Generator", IBM Technical Disclosure Bulletin; vol. 17, No. 6, 1786; (No Month) 1974.
W. F. Weldon, "Pulsed Power Packs a Punch" IEEE Spectrum, p. 59; Mar. 1985.

Primary Examiner—R. Skudy
Attorney, Agent, or Firm—Fitch, Even, Tabin & Flannery

[57] ABSTRACT

A homopolar motor-generator comprising two homopolar machines in series with a conductive belt transmitting current between the rotors of the machines which are caused to rotate in synchronism in oppositely directed magnetic fields to allow extraction of current from relatively low surface speed surfaces.

12 Claims, 3 Drawing Sheets

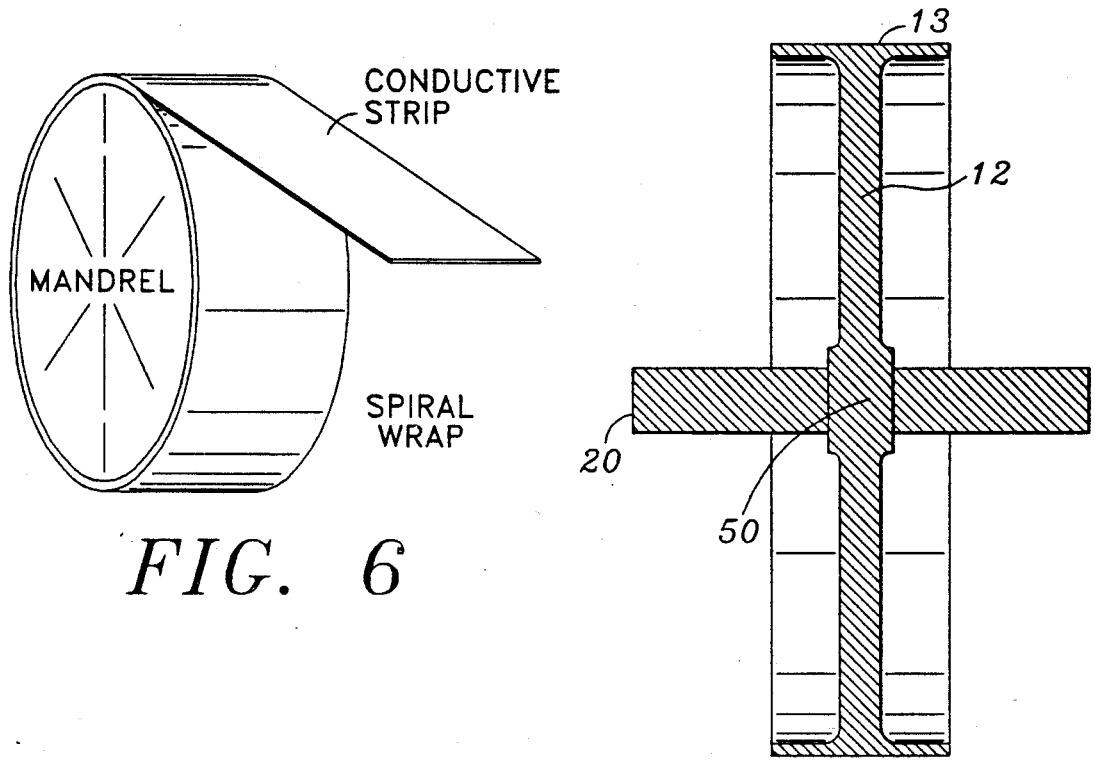
FIG. 6
FIG. 7
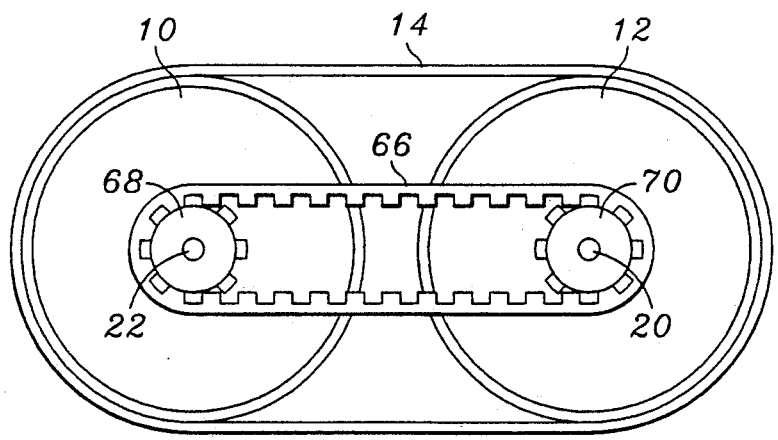
FIG. 8

HOMOPOLAR MOTOR-GENERATOR

RELATED APPLICATION

This is a continuation-in-part of Ser. No. 07/712,008 filed Jun. 7, 1991 and assigned to the same assignee as the present invention.

BACKGROUND OF THE INVENTION

1. Field of the Invention

The present invention relates to homopolar motor-generators, and more particularly to an improved homopolar motor-generator that does not require sliding electrical contacts upon its high linear speed surfaces.

2. Description of the Prior Art

A homopolar motor-generator produces or utilizes direct electric current without resorting to a commutator; it is a true direct current device. The machine is a current rather than a voltage device, producing large currents at low voltages. Historically it has been employed as a ship, locomotive and urban transit drive because it yields full torque at zero speed. It has also been used as a direct current source for both large and small scale welding installations and an energy source for metallurgical heat engineering.

In the past two decades the homopolar machine has gradually become a useful tool in the "high technology" theater. For example, they have served as an energy store, often called "mechanical capacitors," for electromagnetic launchers; as a power supply for pinch and shock wave production in thermonuclear installations; and, as magnet drivers for fusion research Commercially it is employed as a large section butt welder.

The progress and development of homopolar motor-generator technology has been impeded by the requirement for high speed sliding contacts. Such contacts are provided at the periphery of a disc rotor turning on an axle in a magnetic field. A plurality of sliding contacts extract current from the periphery of the rotor and return the current to the axle. Such designs have been limited to speeds of about 200 meters per second. This limitation is discussed in Weldon, W. F., "Pulsed Power Packs a Punch," *IEEE Spectrum*, March, 1985. Other authorities quote speeds under 100 meters per second as the practical limit. The difficulties of gathering current from high-speed conductors are quantified in E. I. Shobert, *Carbon Brushes—The Physics and Chemistry of Sliding Contacts*, (Chemical Publishing Co., New York, 1965).

The limitations and troubles that arise from the sliding contacts are not new. They were fully recognized by the machine's inventor, Michael Faraday. He saw the device's efficiency destroyed by the resistance across the sliding contacts. Faraday attempted to solve the problem with liquid metal contacts using mercury. Today's researchers assault the problem with a variety of techniques ranging from water cooled silver-graphite brushes operating in a special gas environment to complex liquid sodium-potassium metal bath brushes.

One design to eliminate the sliding contacts of the homopolar machine is presented in H. D. Varadarajan, "Planetary Homopolar Generator," *IBM Technical Disclosure Bulletin*, Vol. 17, No. 6, p. 1786–1787, Nov., 1974. The proposed homopolar machine uses a conducting belt or rolling contacts to gather current from a rolling magnetic flux cutting rotor, executing a planetary motion within an annular magnetic field. A first disadvantage of the machine is managing the live loads and large stresses resulting from the centrifugal force of the massive, and unbalanced, planetary rotor. Furthermore, the rate of magnetic flux cutting of the machine's rotor is low, compared to ordinary prior art techniques, because of the slow rotor rotation resulting from the planetary motion. Low rates of magnetic flux cutting imply low output voltages. If high rates of magnetic flux cutting are contemplated by increasing the planetary velocity of the rotor, then the first disadvantage is exacerbated.

As indicated, conventional homopolar motor-generators comprise a disc rotor and a plurality of sliding contacts mounted at the periphery of the disc and riding thereon. Such sliding contacts, usually carbon brushes, are disposed to gather current from the rim of the homopolar's rotor. In practice, the entire rim surface, on the order of square feet, is covered with spring loaded brushes. The resulting drag on the rotor is large, and in turn leads to heating, wear, noise, and maintenance. In high power operations, either continuous or pulsed mode, the brushes produce arc erosion and metal vapor, damaging the rotor surface, and are a source of expensive repair.

Accordingly, there is a need for improved homopolar motor-generators which are not limited by sliding contacts. The present invention satisfies that need.

SUMMARY OF THE INVENTION

The present invention comprises an improved homopolar motor-generator which does not include sliding contacts at its disc rotor rim. The invention incorporates two homopolar disc machines whose disc rotors are coupled to maintain rotational synchronism and behave as a mechanical unit. The peripheries of the disc rotors are electrically connected by a continuous conductive belt. The belt transfers electric energy from disc to disc across a zero velocity interface of low electrical contact resistance. Magnetic means are disposed to produce a potential difference between the axles of the disc rotors. The electric energy is extracted, or input, at the machine's axles, by sliding contact, where the surface speed is relatively low. By gathering current only at the low linear speed surfaces, the problems associated with brush drag, excessive heating, wear, noise, arc erosion, and metal vapor production are eliminated.

BRIEF DESCRIPTION OF THE DRAWINGS

FIG. 6 illustrates a radially collapsible mandrel upon which a conductive strip is wrapped to form the conductive belt of the invention; and, FIG. 7 is a sectional view illustrating a flanged disc rotor of the invention.

FIG. 8 illustrates an embodiment of the invention including the disc rotors mechanically connected with a synchronous drive belt.

DETAILED DESCRIPTION OF THE PREFERRED EMBODIMENT

Figure 1:
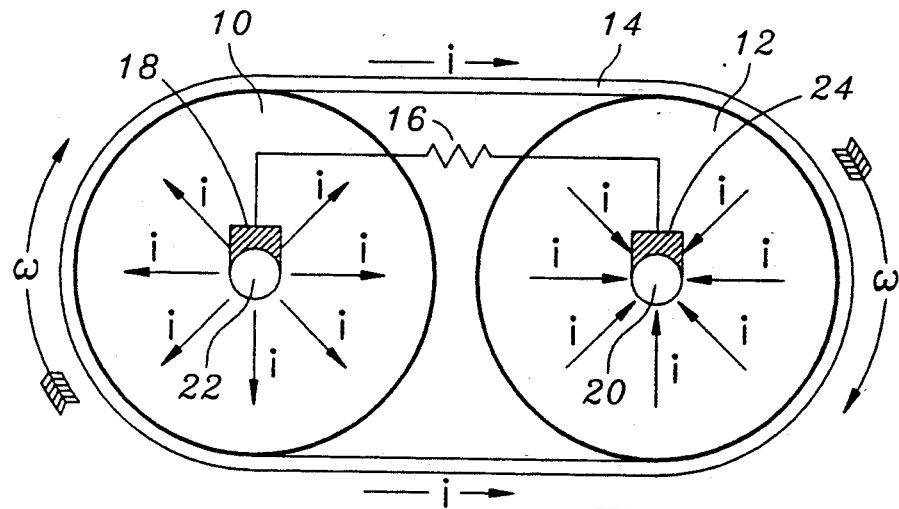
FIG. 1 is a high-level electrical diagram of the homopolar motor-generator.

The electrical circuit of the homopolar motor-generator of the present invention is indicated schematically in FIG. 1. As shown, a disc rotor 10 is electrically connected to companion disc rotor 12 by a metallic belt 14 of low electrical resistance. Magnetic means are provided, but not shown in FIG. 1, to obtain electric current diffusion in rotor 10 that is opposite in sense to that in rotor 12. The current passing through electric load 16 is extracted at spring-loaded carbon brush 18, bearing upon rotor axle 20, and input to rotor axle 22 via spring-loaded carbon brush 24. The path of electric current diffusion through the circuit of the machine is roughly shown by the small arrows labeled by lower case letter i.

Figure 2:
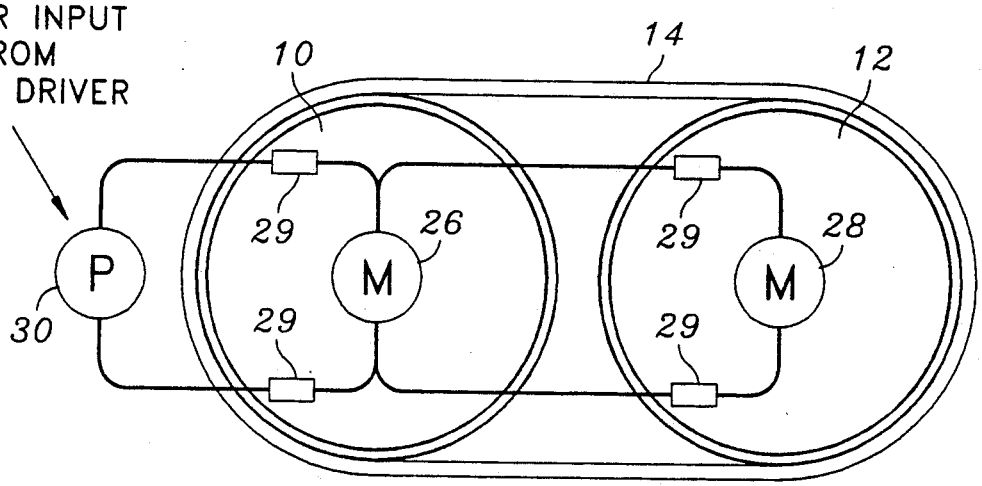
FIG. 2 is a high-level mechanical diagram of the homopolar motor-generator.
Figure 3:
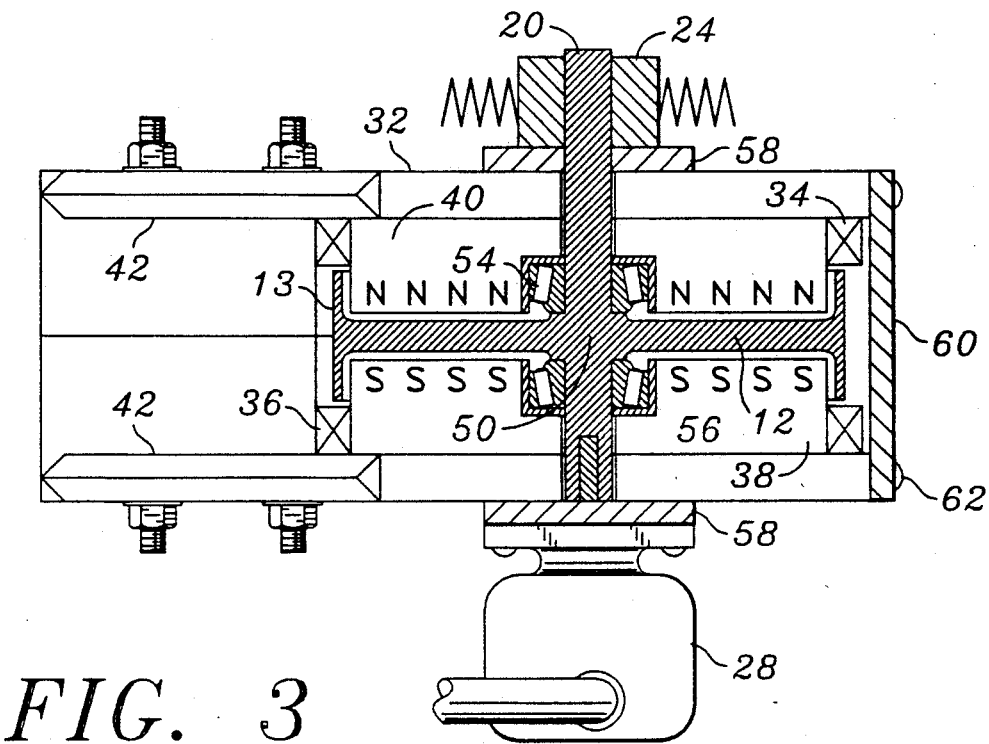
FIG. 3 is a top view of a magnetic stator 32 of the invention containing a disc rotor.

The magnetic means for obtaining electric current diffusion in rotor 10 that is opposite in sense to that of rotor 12 is understood by examining FIG. 3, which shows in cross section parts of magnetic stator 32 associated with rotor 12 driven by a motor 28 (see FIG. 2). Field coils 34 and 36 surround iron pole pieces 38 and 40, and produce the magnetic polarization when energized. The currents in the field coils of companion magnetic stator 44 for the rotor 10 (see FIG. 4) are reversed in direction, thereby producing a magnetic polarization oppositely directed from that of magnetic stator 32. The direction of the diffusion of electric current in rotor 10 or 12 is given by the vector cross product of the rotor's tangential velocity vector with the magnetic field vector between the pole pieces. The current in rotor 10 is reversed in direction with respect to current in rotor 12 as the rotors rotate in identical directions, but in oppositely directed magnetic fields.

The mechanical function of the homopolar motor-generator is indicated schematically in FIG. 2. Although the disc rotors operate in space-phase alignment, often called "self-synchronous" or "selsyn," by virtue of their electrical interconnection by belt 14, in practice the selsyn effect is non-ideal, and so means are provided to supply, or extract, mechanical power and synchronism to the rotors. It is important to bear in mind that belt 14 is not wholly relied upon to transmit mechanical power; its function is to transmit electrical power.

FIG. 2 discloses one preferred method of driving rotors 10 and 12 such that they are synchronized and behave as a mechanical unit. Each disc rotor is furnished with a positive displacement hydraulic motor, labeled 26 and 28. Motors 26 and 28 are driven by positive displacement hydraulic pump 30. Motive power is input or extracted by a prime driver. The prime driver may be an electric motor, internal combustion engine, gas turbine or the like. On the other hand, if used as a motor, converting electric energy into mechanical energy, pump 30 functions as the "power take-off."

Examination of FIG. 2 shows that motors 26 and 28 are driven in parallel by pump 30. In practice, if the hydraulic lines are conductive, they must be interrupted by dielectric inserts 29, as a voltage difference exists between axles 20 and 22 during operation. Inserts 29 may be fabricated from a high strength Melamine G-9 resin if the hydraulic fluid temperature does not exceed 150 degrees C. If higher fluid temperature operation is required, and the use of a heat exchanger is unacceptable, the inserts can be fabricated from TORLON resin, yielding a maximum operating temperature of 250 degrees C. The TORLON inserts and the Melamine G-9 resin may be obtained from Accurate Plastics Company of New York.

FIG. 3 illustrates a magnetic stator 32 for the disc rotor 12 (shown in cross-section). Field coils 34 and 36 wound on pole pieces 38 and 40 respectively, magnetically polarize the pole pieces, if permanent magnets are not employed. Upon the yoke of stator 32 are so-called "V—ways", labeled 42, similar to those used for the precision alignment of carriages on the beds of engine lathes.

Figure 4:
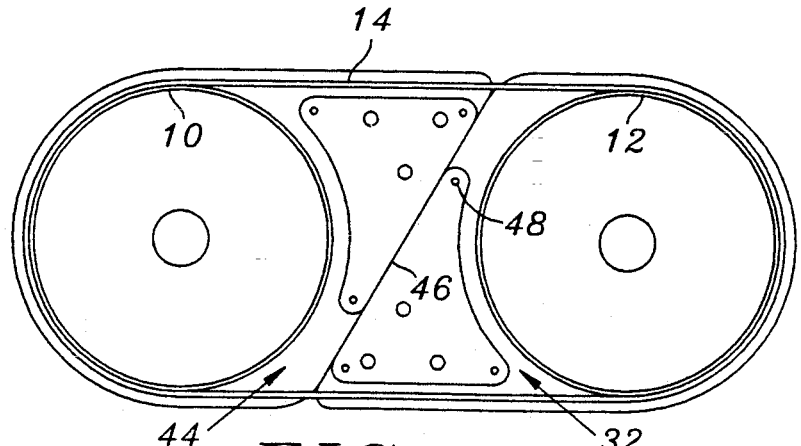
FIG. 4 shows the relation of the conducting belt with the magnetic stators 32 and 44.

FIG. 4 shows magnetic stator 32 and a corresponding stator 44 for the rotor 10 assembled, but with the pole piece halves removed to expose belt 14 to view. Belt 14 passes over the flanges of disc rotors 10 and 12. The structure of the flanges is discussed hereinbelow. Where the yoke halves join registration pins 48 are furnished to obtain proper alignment. Companion magnetic stator 44 possesses complimentary V—ways (not shown), upon its yoke, to engage V—ways 42 of stator 32, thereby obtaining alignment in combination with travel along interface 46. The travel is used to obtain tension in conductive belt 14.

Figure 5:
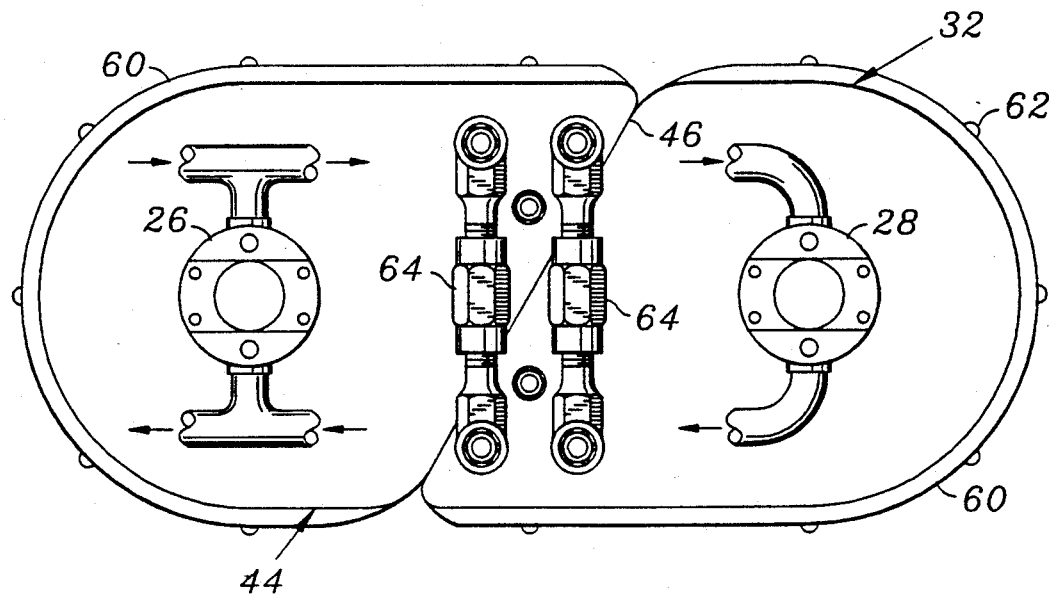
FIG. 5 shows the belt tensioning mechanism and fluid power transmission system.

FIG. 5 shows the belt tensioning mechanism comprising conventional turnbuckles 64 between the stators 32 and 44 over and transverse to the interface 46. The adjustment of the of turnbuckles 64 causes relative movement between magnetic stators 32 and 44 along sliding interface 46. The relative movement causes an increase in the distance between the rotors, and applies tension to belt 14. As tension is gradually applied to belt 14, the rotors are slowly rotated to insure the distribution and equilibration of tensile stress throughout the belt's laminated structure. By this means the tension of belt 14 is adjusted without disturbing the alignments of the invention.

FIG. 5 also shows the positive displacement hydraulic motors 26 and 28 joined to the disc rotor shafts. Suitable fluid power transmission systems such as the SAUER-SUNDSTRAND Series 90 are available from the Sperry Vickers Powersystems Company of Troy, Mich. The specific system is selected according to the operating requirements at hand. A range of systems are readily available that operate from low power, to those that obtain 5300 revolutions per minute in excess of 500 horsepower. The systems are optionally furnished with electronic shaft angle encoders operating in combination with feedback controls to obtain additional rotational synchronism of motors 26 and 28, if so required. Motors 26 and 28 possess splined shafts to mate with rotor axles 20 and 22. Preferably, motors 26 and 28 are electrically isolated from magnetic stators 32 and 44 by N.E.M.A. grade G-10 plates 58. Plates 58 are shown on FIG. 3. The yokes of magnetic stators 32 and 44 are preferably fully closed by magnetic flux linking shroud 60, held by fasteners 62. The addition of shroud 60 increases the electrical efficiency of the machine by reducing the reluctance of the magnetic circuit. Importantly, shroud 60 functions as a safety screen, and seals against dirt and moisture.

Examination of disc rotor 12 in FIG. 3 and FIG. 7, shows it outfitted with a flat flange 13, possessing no crown, and being similar to pulleys employed in German and English metallic belt drive systems. Depending upon the specific application, the rotors are made of different materials including clad materials. For moderate power levels, 7000 series aluminum or copper alloys may be employed. For high-performance units, brasses may be employed such as TUF-STUF, possessing tensile strengths of 125,000 psi, available from Mueller Brass Company. Regardless of the choice of rotor material, the flanges must possess an adherent coating of copper. In practice, if copper coating is required, and electro-deposition is impractical, copper is flame sprayed upon the flange surfaces and dressed to a suitable finish. The purpose of the copper coating is to obtain low electrical contact resistance and substantial static friction between belt 14 and the rotor flanges.

FIG. 3 shows one method of supporting rotor 12 within magnetic stator 32. The disc of rotor 12 possesses a boss 50 which is shrunk fit upon rotor axle 20. Structural advantage is obtained if boss 50 and axle 20 also interlock by splines. Axle 20 is supported upon roller bearing assemblies 54. To obtain electrical isolation, bearing assemblies 54 may be housed in National Electrical Manufacturer's Association (N.E.M.A.) grade G-10 Glass Reinforced Epoxy cups 56, preferred for their excellent electrical insulation in combination with a compressive strength of 60,000 psi. Preferably, a similar support assembly is provided for rotor 10 within magnetic stator 44.

The art and technique of rotor design, including bearing configurations and cooling, in regard to homopolar machines, is presently very advanced. Thus, the aforementioned description is for one embodiment only, and in practice the specific bearing design would be application dependent. For example, in a low-performance unit a mundane bearing system would suffice; while in a high-performance unit, the often-called "hydrostatic bearing," well known to rotating machinery engineers, would be employed.

The following discusses the structure and construction of a conductive belt suitable for the invention. A preferred belt material is from the family of Beryllium-Copper alloys, such as Beryllium Alloy 50 of the Beryllium Co., Ampcoloy 91 of Ampco Metals Inc., or Trodaloy 1 of General Electric Inc. The wrought alloys possess 65% the conductivity of pure copper and give a heat treat strength of 130,000 psi. These materials also possess toughness and an absence of work hardening.

Belt 14 is formed from a strip of the aforementioned Be-Cu alloy, whose thickness depends upon the rotor flange radius of curvature and the electric current bearing application at hand. A thickness of 0.015 to 0.030 inch is generally suitable. The alloy strip is plated with electro-deposited copper, preferred for its excellent adhesion, approximately 0.0005 inch thick.

Belt 14 is manufactured by wrapping the aforementioned copper plated alloy strip upon a radially contractible mandrel and forming a multi-layered structure as shown in FIG. 6. A suitable mandrel, often-called an "expanding wheel," is described by H. Herkimer in *Engineer's Illustrated Thesaurus*, (Chemical Publishing Co., New York, 1952), Class IV, p.226,7. The number of layers depends upon the current carrying application under consideration. The perimeter of the mandrel is sized to obtain proper fit with rotors 10 and 12. The outside belt end is joined to its neighbor by electron beam welding. The inside belt end is joined to its neighbor in similar fashion. The inside belt surface that is in contact with the rotor flanges must be free of any containments. Belt 14 of this design can be fabricated by Anionics Inc. of Oriskany, N.Y., and is a flexible structure due to its laminated construction. Also, the copper-copper interfaces between the compressed layers of belt 14, and including the copper clad rotor flanges, obtain a minimum static coefficient of friction of 1.6, thereby obtaining low electrical contact resistance in combination with excellent tractive force. For the purposes of comparison, brake material on clean cast iron obtains a static coefficient of friction of 0.4. If the belt and rotors were operated in a clean dry nitrogen atmosphere a static coefficient of friction of 4.0 instead of 1.6 would be obtained. Any increase in belt traction is desirable as it is an aid to both rotational synchronism and electrical contact efficiency.

While a particular and preferred form of homopolar motor-generator has been described, it is appreciated that changes may be made in the illustrated form, some of which have been suggested hereinabove, without departing from the spirit of the present invention. For example, FIG. 8 illustrates an alternate means of driving rotors 10 and 12 such that they are synchronized and behave as a mechanical unit. In this regard, the previously described fluid power transmission system is replaced with a synchronous drive belt, or so-called "timing belt" system. Toothed timing belt 66 runs upon cogged timing pulleys 68 and 70 fitted respectively to rotor shafts 20 and 22. Commercially available synchronous drive belt systems operate suitably in a power range from fractional horsepower to powers of industrial significance.

Accordingly, it is intended that the present invention be limited in scope only by the terms of the following claims.

I claim:
1. A homopolar motor generator comprising:
   first and second rotors for turning on first and second axles respectively;
   means for turning said first and second rotors in synchronism;
   magnetic flux generating and linking means for directing magnetic fields in opposite directions axially through said first and second rotors;
   a current conductive belt around said first and second rotors and supported on relatively high linear speed surfaces thereof to move therewith and transmit current between said first and second rotors; and
   electrical circuit means for extracting current from a relatively low surface speed region of said first rotor and transmitting the current to a relatively low surface speed region of said second rotor.
2. The motor generator of claim 1 wherein said first and second rotors are laterally separated with said first and second axles extending substantially parallel to each other.
3. The motor generator of claim 2 including means for controlling the lateral separation of said first and second rotors and hence tensioning said belt around said rotors.
4. The motor generator of claim 1 wherein said belt compresses a series of layers of a flexible conductive strip only joined at its opposite ends to adjacent regions of the strip whereby said layers are free to move relative to their neighbors to accommodate an equalization of tensile stresses in said belt during belt tensioning.
5. The motor generator of claim 4 wherein said strip is formed of a beryllium-copper alloy.
6. The motor generator of claim 5 wherein said strip possesses a pure copper overcoat.
7. The motor generator of claim 1 wherein said rotors include flat outer annular flanges for supporting an inner surface of said belt in passing over and around said rotors.

8. The motor generator of claim 7 wherein the flanges include copper coated outer surfaces.

9. The motor generator of claim 1 wherein said means for turning said first and second rotors in synchronism comprises first and second hydraulic motors for driving said first and second axles respectively and a hydraulic pump driving said first and second motors in parallel.

10. The motor generator of claim 9 including dielectric inserts in hydraulic lines connecting said pump and said motors to interrupt current flow in said lines.

11. The motor generator of claim 10 wherein said hydraulic motors are electrically isolated.

12. The motor generator of claim 1 wherein the means for turning said first and second rotors in synchronism comprises a mechanical connection of the first and second axles by an endless synchronous drive belt running upon cogged timing pulleys secured to the axles.

* * * * *